UNITED STATES PATENT OFFICE 2,452,536

PROCESS FOR IMPREGNATING LEATHER WITH SULFONATED POLYMERIC COMPOSITIONS

Joseph S. Kirk, Seven Hills Village, Ohio, assignor to E. I. du Pont de Nemours & Company, Wilmington, Del., a corporation of Delaware No Drawing. Application July 25, 1944, Serial No. 546,579

7 Claims. (Cl. 8—94.21)

This invention relates to modifying leather and more particularly to processes in which leather is modified by subjecting it to contact with a solution of a sulfonated polymeric material having a plurality of carboxyl groups attached to aliphatic carbon, and a plurality of sulfonic groups attached to aromatic carbon.

U. S. Patents 2,205,882 and 2,205,883 to Graves describe tanning processes which employ as tanning agents acidic polymeric materials in which the acidity is due to carboxyl groups attached to carbon atoms. The present invention is concerned with processes in which polymeric materials containing carboxyl groups attached to aliphatic carbon atoms and additionally containing sulfonic groups are employed in the production of leather having improved properties. According to the Graves patents, the tanning agents there described are preferably used in the pH range above about 3.0. At lower pH values Graves' materials tend to lack sufficient solubility to be useful for treating and modifying leather.

Monomeric sulfonated materials have already been used for modifying leather, but the leather products so produced lack color stability when subjected to ultraviolet light. Even the intensity of ultraviolet light found in direct sunlight is often enough to affect deleteriously the color of such leather products.

It is an object of this invention to provide processes for producing leather of improved quality and especially for bleaching chrome-tanned leather. Another object is to provide processes for producing bleached chrome leather which is resistant to the action of ultraviolet light. Other objects will appear hereinafter.

The foregoing and other objects of this invention are accomplished by processes in which leather is modified by subjecting it to contact with a solution of a sulfonated polymeric material having a plurality of carboxyl groups attached to aliphatic carbon and a plurality of sulfonic groups attached to aromatic carbon.

The sulfonated polymeric compositions used in the processes of this invention are completely soluble even at low pH, and when used for bleaching chrome leather give a product, the color of which is stable under ultraviolet light.

The compositions employed in a process of this invention are polymers of the type described in Graves' Patent 2,205,882 which have been sulfonated. Included are sulfonates derived from co-polymers of alpha-unsaturated carboxylic acids and their equivalent anhydrides, such as maleic anhydride, polyacrylic acid, and polymethacrylic acid, with polymerizable olefins containing an aromatic substituent, such as styrene, methyl styrene, and indene. The invention is particularly concerned with processes employing sulfonation products of co-polymers of maleic anhydride and styrene.

The compositions employed have a plurality of carboxyl groups. The carboxyl groups may have the structural formula

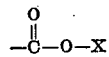

where X is hydrogen or a metal or an ester group. Such carboxyl groups are attached to aliphatic carbon, that is, a carbon atom which is a part of an acyclic or saturated cyclic structure. The compositions also contain a plurality of sulfonic groups which may have the structure,

where X is hydrogen or a metal or an ester group. Such sulfonic groups are attached to aromatic carbon, that is to carbon which is a part of an unsaturated cyclic structure, such as a benzene ring. By plurality is meant that there is more than one of the particular groups in the entire molecule, but not necessarily more than one at any single point of attachment.

Such sulfonated polymeric materials may be prepared by methods with which the art is already acquainted in connection with the sulfonation of other types of compounds. For example, they may be prepared by treatment of a suitable polymeric material with chlorosulfonic acid or concentrated sulfuric acid.

The modification of leather accomplished by processes of this invention may consist of filling, plumping, or otherwise altering the physical characteristics of the leather, and this modification is especially concerned with the bleaching of leather. The processes are well adapted for the bleaching of chrome-tanned leather to give a very white, light-stable product.

Sulfonated polymeric materials in which at least a part of the carboxyl groups are esterified are particularly useful in processes for fatliquoring leather in accordance with this invention. Preferably, such processes employ the half-ester of a sulfonated heteropolymer of styrene and maleic anhydride; that is, compounds in which the anhydride linkages in the molecule due to the maleic anhydride are opened up to form carboxyl groups, and of each two carboxyl groups so formed one is esterified, as by treating with an alcohol under dehydrating conditions. Irrespective of the polymer employed, the ester groups used should be those of higher molecular weight alcohols, such as lauryl and stearyl alcohols, if the maximum fatliquoring effect is to be obtained.

According to a method of this invention, leather is subjected to contact with a solution of a sulfonated polymeric material, such as above described, preferably in ordinary tanning machinery, and by techniques customarily employed for causing effective contact between the skins or leather and a treating solution. It will be understood that the processes of this invention are concerned with the production of leather having improved quality and that the processes may be applied either before, during, or after the tanning step. In the production of a light-stable, light-colored, chrome leather for instance, the treatment with sulfonated polymeric material may be employed as a separate step before or after the chrome tanning or sulfonated polymeric material may be added directly to the chrome tanning solution and used simultaneously with the chrome tanning step.

When the leather-modifying processes of this invention comprise bleaching chrome leather, they are carried out in the pH range of about 1.5 to 3.0. Exposure of leather to a very low pH is undesirable, but no difficulty is encountered when the pH is from 1.5 to 3.0 and the acidity is due to or accompanied by the presence of sulfonated polymeric compositions here described and the time of contact is not greatly extended beyond that required to bleach chrome leather.

The nature of this invention and its manner of application may be better understood by reference to the following illustrative examples.

*Example I*

A sulfonated polymeric material having a plurality of carboxyl groups attached to aliphatic carbon and a plurality of sulfonic groups attached to aromatic carbon was prepared in the following manner:

A styrene-maleic anhydride co-polymer was prepared as described in the example, page 2, of Condo et al., U. S. Patent 2,286,062, by catalytic polymerization of styrene and maleic anhydride in xylene solution. Seventy-five parts by weight of the solid co-polymer produced before digestion in sodium hydroxide was suspended in 600 parts of ethylene dichloride. To this well-agitated mixture there was added slowly and carefully 33 parts of chlorosulfonic acid and 62.5 parts of ethylene dichloride over a period of one hour. No cooling or heating was required; the temperature remained at about 34° C. Agitation was continued for one-half hour after addition of the chlorosulfonic acid was complete. No gumming up or other agitation difficulty was encountered. The product was then removed by filtration and was air-dried to yield 125 parts by weight of a light tan granular solid. A solution of this sulfonated co-polymer was made by dissolving 16 parts by weight of the solid in 84 parts of hot water and adding sufficient 50% sodium hydroxide solution to give a pH of 2.9 in the solution.

The solution obtained as above described was used for bleaching chrome-tanned calfskin according to a process of this invention by immersing 50 parts by weight of the chromed calfskin in a mixture of 6 parts of the concentrated solution diluted with 75 parts of water and agitating for ½-hour. The chromed calfskin was then removed, washed, and dried according to customary practices. The leather obtained was observed to be full, plump, and had a pleasing light color. As compared to the untreated chromed calfskin, the color was much lighter. It was further found that the color of the treated leather did not change appreciably even after prolonged exposure to ultraviolet light.

*Example II*

A polymer of styrene and maleic anhydride which had been prepared by catalytically polymerizing styrene and maleic anhydride as described in Condo et al. Patent 2,286,062, was sulfonated in the following manner:

To 1600 parts by weight of anhydrous ethylene dichloride there was added 200 parts by weight of unneutralized styrene-maleic anhydride polymer which had been ground approximately to 100 mesh. The mixture was cooled to 0° C. and a solution of 172 parts by weight of chlorosulfonic acid in 400 parts of anhydrous ethylene dichloride was added during the course of 45 minutes with vigorous agitation. The resultant mixture was allowed to stand at room temperature for 20 hours and was then heated for 15 minutes at 65° C. after which time vigorous evolution of hydrogen chloride had ceased. The sulfonated polymer was obtained as a brown powder mixed with ethylene dichloride. The powder was filtered off and dried in a current of air until free of ethylene dichloride.

A solution for the treatment of skins according to the present invention was made up as follows: In 300 parts by weight of water there was dissolved 20 parts of sulfonated styrene-maleic anhydride polymers prepared as above described. The pH of the solution was raised to 6.0 by adding caustic soda. There was then added 10 parts by weight of sodium chloride.

The solution just described was placed in a tanning drum and there was added 200 parts by weight of pickled goat skin at a pH of 2.5, and the drum was run for two hours. The pH was found to be 2.9. There was then added 40 parts by weight of a chrome tanning solution containing basic chromium sulfate equivalent to 25% by weight of sodium dichromate dihydrate. Agitation of the skins was then resumed and continued for one hour without interruption. The solution was then observed to have a pH of 2.65. The pH was raised to 3.7 by adding a 10% solution of sodium bicarbonate in small increments, with agitation after each increment of addition. This required 2½ hours. The skins were then allowed to stand over night in the solution. On the following day the pH was raised to 4.8 by adding sodium bicarbonate solution with agitation over a period of one hour and fifteen minutes. Skins were then removed, rinsed lightly in running water, and placed in a drum containing 300 parts by weight of water and 10 parts of 10% sodium bicarbonate solution and agitation was continued until the pH was 5.5. The leather produced was washed thoroughly and fatliquored according to conventional practice, set out, dried, and examined.

By comparison with a control batch of skins tanned in identical manner except without pretreatment with sulfonated polymer, the leather produced was found to have greatly improved body, softness, and general desirability.

It was also observed that the tanning solution containing the skin pretreated with sulfonated polymer remained clear throughout tannage while the control solution containing skins without pretreatment became loaded with a gelatinous precipitate during neutralization.

*Example III*

A sulfonated styrene-maleic anhydride polymer was prepared by slurrying 50 parts by weight of styrene-maleic anhydride polymer in 400 parts of anhydrous ethylene dichloride at 0° C. and adding 43 parts by weight of chlorosulfonic acid dissolved in 100 parts of anhydrous ethylene dichloride, with vigorous agitation over a period of 30 minutes, while maintaining the temperature of the solution at above 0° C., and then allowing the temperature of the mixture to rise to room temperature (25° C.) during one hour with continued vigorous agitation. The reaction mass was then allowed to stand for 20 hours at room temperature and the ethylene dichloride was then distilled off. The mass was then dissolved in 5000 parts by weight of water with gentle heating and additional ethylene dichloride was removed by decantation and boiling. There was obtained a reddish brown solution which was made up to 500 parts by weight with water. The diluted solution had a pH of 1.5.

Skins were treated with a sulfonated styrene-maleic anhydride polymer simultaneously with a chrome tanning process in the following manner:

To a tanning drum containing 200 parts by weight of drained pickled goat skins there was added the following solution in the indicated parts by weight:

| | Parts |
|---|---|
| Water | 300 |
| Salt (NaCl) | 10 |
| Basic chromium sulfate (chrome equivalent to 25% sodium dichromate dihydrate) | 40 |
| Sulfonated styrene-maleic anhydride polymers prepared as above described | 20 |

The skins were agitated in the solution for 3½ hours at which time the pH was found to be 2.0. The pH was raised to 3.6 by adding 10% sodium bicarbonate solution in increments over a period of 1½ hours with continuing agitation. The skins were then allowed to stay in the solution over night. The pH of the solution was then raised to about 4.1 by further addition of sodium bicarbonate solution over a period of 30 minutes. The skins were then rinsed lightly with water and were further neutralized by agitating for one hour in a solution containing 300 parts by weight of water and 15 parts by weight of 10% sodium bicarbonate solution. This raised the pH to 4.7. The skins were then washed thoroughly and fatliquored according to commercial practice.

After drying the skins were observed to be much fuller in body and more firm in their grain characteristics than a similar set tanned in identical manner but without the presence of the sulfonated styrene-maleic anhydride polymer.

*Example IV*

The sulfonated styrene-maleic anhydride polymer solution prepared as described in Example III was used for treating chrome tanned skins in the following manner:

To 200 parts by weight of drained pickled calf skin in a tanning drum there was added the following solution in the indicated parts by weight:

| | Parts |
|---|---|
| Water | 300 |
| Common salt (NaCl) | 10 |
| Basic chromium sulfate solution containing chromium equivalent to 25% sodium dichromate dihydrate | 40 |

The skins were agitated in this solution for 2¼ hours at a pH of 2.3. They were then basicified with 10% sodium bicarbonate solution during the course of three hours and 35 minutes to a pH of 3.4 and allowed to stand over night in contact with the solution. On the following morning there was added to the drum 20 parts by weight of the solution of sulfonated styrene-maleic anhydride polymer prepared as described in Example III and the skins were agitated in the solution for one hour. The skins were then rinsed, placed in a tanning drum with 300 parts by weight of water and neutralized to pH 4.4 by further addition of sodium bicarbonate with agitation over a period of 1½ hours. The skins were then washed thoroughly, fatliquored according to conventional practice, set out, and dried.

The chrome tanned skins thus prepared were observed to be much rounder, fuller, and lighter in color than a similar set run in identical manner but without the subsequent treatment with sulfonated styrene-maleic anhydride polymer.

While in the foregoing description of this invention, there have been shown certain specific processes for producing leather having improved properties, it will be understood that without departing from the spirit of this invention, one skilled in the art may employ various processes.

This application is a continuation-in-part of United States patent application Serial No. 507,900, filed October 27, 1943, for "Leather treatment and compositions therefor."

I claim:

1. In a process for modifying leather, the step comprising thoroughly impregnating the leather with a solution of a sulfonated polymeric composition formed by reacting a polymerizable unsaturated carboxylic acid with a polymerizable olefin containing an aromatic substituent and sulfonating the product.

2. In a process for modifying leather, the step comprising thoroughly impregnating the leather with a solution of a sulfonated co-polymer of styrene and maleic anhydride.

3. In a process for modifying leather, the step comprising thoroughly impregnating the leather with a solution of a sulfonated co-polymer of indene and methacrylic acid.

4. In a process for modifying leather, the step comprising thoroughly impregnating the leather with a solution of a sulfonated co-polymer of methyl styrene and maleic anhydride.

5. In a process for producing bleached chrome-tanned leather, the steps comprising subjecting a skin to a chrome-tanning process and to thorough impregnation at a pH of about from 1.5 to 3.0 with a solution of a sulfonated polymeric composition formed by reacting a polymerizable unsaturated carboxylic acid with a polymerizable olefin containing an aromatic substituent and sulfonating the product.

6. In a process for fatliquoring leather, the step comprising thoroughly impregnating the leather with a solution of a sulfonated polymeric composition formed by reacting a polymerizable unsaturated carboxylic acid ester with a polymerizable olefin containing an aromatic substituent and sulfonating the product.

7. In a process for producing bleached chrome-tanned leather, the steps comprising subjecting a skin to a chrome tanning treatment and to thorough impregnation at a pH of about from 1.5 to 3.0 with a solution of a sulfonated co-polymer of styrene and maleic anhydride.

JOSEPH S. KIRK.

REFERENCES CITED

The following references are of record in the file of this patent:

UNITED STATES PATENTS

| Number | Name | Date |
|---|---|---|
| 1,523,390 | Breedis | Jan. 20, 1925 |
| 1,945,461 | Blackadder | Jan. 30, 1934 |
| 1,957,324 | Dambacher | May 1, 1934 |
| 2,017,863 | Jaeger | Oct. 22, 1935 |
| 2,028,091 | Jaeger | Jan. 14, 1936 |
| 2,031,929 | Breuers | Feb. 25, 1936 |
| 2,115,562 | Orthmann | Apr. 26, 1938 |
| 2,204,512 | Russell | June 11, 1940 |
| 2,205,882 | Graves | June 25, 1940 |
| 2,205,883 | Graves | June 25, 1940 |
| 2,268,091 | Niedercorn | Dec. 30, 1941 |
| 2,292,067 | Geister | Aug. 4, 1942 |
| 2,303,209 | Grim | Nov. 24, 1942 |
| 2,341,413 | Pense | Feb. 8, 1944 |
| 2,356,879 | Pense | Aug. 29, 1944 |